US011942013B2

United States Patent

(12) United States Patent
Messer et al.
(10) Patent No.: US 11,942,013 B2
(45) Date of Patent: Mar. 26, 2024

(54) COLOR UNIFORMITY CORRECTION OF DISPLAY DEVICE

(71) Applicant: Magic Leap, Inc., Plantation, FL (US)

(72) Inventors: Kevin Messer, Mountain View, CA (US); Miller Harry Schuck, III, Erie, CO (US); Nicholas Ihle Morley, Deerfield Beach, FL (US); Po-Kang Huang, Sunnyvale, CA (US); Nukul Sanjay Shah, Plantation, FL (US); Marshall Charles Capps, Austin, TX (US); Robert Blake Taylor, Porter Ranch, CA (US)

(73) Assignee: Magic Leap, Inc., Plantation, FL (US)

( * ) Notice: Subject to any disclaimer, the term of this patent is extended or adjusted under 35 U.S.C. 154(b) by 6 days.

(21) Appl. No.: 17/359,322

(22) Filed: Jun. 25, 2021

(65) Prior Publication Data

US 2021/0407365 A1 Dec. 30, 2021

Related U.S. Application Data

(60) Provisional application No. 63/044,995, filed on Jun. 26, 2020.

(51) Int. Cl.
*G09G 3/20* (2006.01)
*G09G 5/10* (2006.01)

(52) U.S. Cl.
CPC ............ *G09G 3/2003* (2013.01); *G09G 5/10* (2013.01); *G09G 2300/0452* (2013.01); *G09G 2340/06* (2013.01)

(58) Field of Classification Search
CPC .................. G09G 3/2003; G09G 5/10; G09G 2300/0452; G09G 2340/06
See application file for complete search history.

(56) References Cited

U.S. PATENT DOCUMENTS 11,270,377 B1 * 3/2022 Sprague ................ G06Q 40/04
2003/0184660 A1 * 10/2003 Skow .................... H04N 23/88
348/223.1

(Continued)

OTHER PUBLICATIONS

Application No. PCT/US2021/039233 , International Search Report and Written Opinion, dated Sep. 29, 2021, 7 pages.

(Continued)

*Primary Examiner* — Amare Mengistu
*Assistant Examiner* — Jennifer L Zubajlo
(74) *Attorney, Agent, or Firm* — KILPATRICK TOWNSEND & STOCKTON LLP

(57) ABSTRACT

Disclosed are techniques for improving the color uniformity of a display of a display device. A plurality of images of the display are captured using an image capture device. The plurality of images are captured in a color space, with each image corresponding to one of a plurality of color channels. A global white balance is performed to the plurality of images to obtain a plurality of normalized images. A local white balance is performed to the plurality of normalized images to obtain a plurality of correction matrices. Performing the local white balance includes defining a set of weighting factors based on a figure of merit and computing a plurality of weighted images based on the plurality of normalized images and the set of weighting factors. The plurality of correction matrices are computed based on the plurality of weighted images.

17 Claims, 14 Drawing Sheets

(56) References Cited

U.S. PATENT DOCUMENTS

| | | | | |
|---|---|---|---|---|
| 2009/0147098 | A1* | 6/2009 | Li | H04N 23/88<br>348/E11.001 |
| 2014/0267826 | A1* | 9/2014 | Danowitz | H04N 23/80<br>348/223.1 |
| 2016/0373618 | A1* | 12/2016 | Tajbakhsh | H04N 9/646 |
| 2017/0124928 | A1* | 5/2017 | Edwin | G06F 3/013 |
| 2017/0171523 | A1* | 6/2017 | Radakovic | H04N 5/2226 |
| 2017/0359498 | A1* | 12/2017 | Benchemsi | G06T 5/50 |
| 2019/0045162 | A1* | 2/2019 | Krestyannikov | H04N 9/3182 |
| 2019/0226830 | A1* | 7/2019 | Edwin | H04N 13/327 |

OTHER PUBLICATIONS

Application No. PCT/US2021/039233 , "International Preliminary Report on Patentability", dated Jan. 5, 2023, 6 pages.

* cited by examiner

COLOR UNIFORMITY CORRECTION OF DISPLAY DEVICE

CROSS-REFERENCES TO RELATED APPLICATIONS

This application claims the benefit of priority to U.S. Provisional Patent Application No. 63/044,995, filed Jun. 26, 2020, entitled "COLOR UNIFORMITY CORRECTION OF DISPLAY DEVICE," the entire content of which is incorporated herein by reference for all purposes.

BACKGROUND OF THE INVENTION

A display or display device is an output device that presents information in visual form by outputting light, often through projection or emission, toward a light-receiving object such as a user's eye. Many displays utilize an additive color model by either simultaneously or sequentially displaying several additive colors, such as red, green, and blue, of varying intensities to achieve a broad array of colors. For example, for some additive color models, the color white (or a target white point) is achieved by simultaneously or sequentially displaying each of the additive colors at a non-zero and relatively similar intensity, and the color black is achieved by displaying each of the additive colors at zero intensity.

The accuracy of the color of a display may be related to the actual intensity for each additive color at each pixel of the display. For many display technologies, it can be difficult to determine and control the actual intensities of the additive colors, particularly at the pixel level. As such, new systems, methods, and other techniques are needed to improve the color uniformity across such displays.

SUMMARY OF THE INVENTION

The present disclosure relates generally to techniques for improving the color uniformity of displays and display devices. More particularly, embodiments of the present disclosure provide techniques for calibrating multi-channel displays by capturing and processing images of the display for multiple color channels. Although portions of the present disclosure are described in reference to augmented reality (AR) devices, the disclosure is applicable to a variety of applications in computer vision and display technologies.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of displaying a video sequence comprising a series of images on a display, the method comprising: receiving the video sequence at a display device, the video sequence having a plurality of color channels; applying a per-pixel correction to each of the plurality of color channels of the video sequence using a correction matrix of a plurality of correction matrices, wherein each of the plurality of correction matrices corresponds to one of the plurality of color channels, and wherein applying the per-pixel correction generates a corrected video sequence having the plurality of color channels; and displaying the corrected video sequence on the display of the display device.

Example 2 is the method of example(s) 1, wherein the plurality of correction matrices were previously computed by: capturing a plurality of images of the display using an image capture device, wherein the plurality of images are captured in a color space, and wherein each of the plurality of images corresponds to one of the plurality of color channels; performing a global white balance to the plurality of images to obtain a plurality of normalized images each corresponding to one the plurality of color channels; and performing a local white balance to the plurality of normalized images to obtain the plurality of correction matrices, wherein performing the local white balance includes: defining a set of weighting factors based on a figure of merit; computing a plurality of weighted images based on the plurality of normalized images and the set of weighting factors; and computing the plurality of correction matrices based on the plurality of weighted images.

Example 3 is the method of example(s) 1, further comprising: determining a plurality of target source currents using the plurality of correction matrices; and setting a plurality of source currents of the display device to the plurality of target source currents.

Example 4 is a non-transitory computer-readable medium comprising instructions that, when executed by one or more processors, cause the one or more processors to perform operations comprising: receiving a video sequence comprising a series of images at a display device, the video sequence having a plurality of color channels; applying a per-pixel correction to each of the plurality of color channels of the video sequence using a correction matrix of a plurality of correction matrices, wherein each of the plurality of correction matrices corresponds to one of the plurality of color channels, and wherein applying the per-pixel correction generates a corrected video sequence having the plurality of color channels; and displaying the corrected video sequence on a display of the display device.

Example 5 is the non-transitory computer-readable medium of example(s) 4, wherein the plurality of correction matrices were previously computed by: capturing a plurality of images of the display using an image capture device, wherein the plurality of images are captured in a color space, and wherein each of the plurality of images corresponds to one of the plurality of color channels; performing a global white balance to the plurality of images to obtain a plurality of normalized images each corresponding to one the plurality of color channels; and performing a local white balance to the plurality of normalized images to obtain the plurality of correction matrices, wherein performing the local white balance includes: defining a set of weighting factors based on a figure of merit; computing a plurality of weighted images based on the plurality of normalized images and the set of weighting factors; and computing the plurality of correction matrices based on the plurality of weighted images.

Example 6 is the non-transitory computer-readable medium of example(s) 4, wherein the operations further comprise: determining a plurality of target source currents using the plurality of correction matrices; and setting a plurality of source currents of the display device to the plurality of target source currents.

Example 7 is a system comprising: one or more processors; and a non-transitory computer-readable medium comprising instructions that, when executed by the one or more processors, cause the one or more processors to perform operations comprising: receiving a video sequence comprising a series of images at a display device, the video sequence having a plurality of color channels; applying a per-pixel correction to each of the plurality of color channels of the video sequence using a correction matrix of a plurality of correction matrices, wherein each of the plurality of correction matrices corresponds to one of the plurality of color channels, and wherein applying the per-pixel correction generates a corrected video sequence having the plurality of color channels; and displaying the corrected video sequence on a display of the display device.

Example 8 is the system of example(s) 7, wherein the plurality of correction matrices were previously computed by: capturing a plurality of images of the display using an image capture device, wherein the plurality of images are captured in a color space, and wherein each of the plurality of images corresponds to one of the plurality of color channels; performing a global white balance to the plurality of images to obtain a plurality of normalized images each corresponding to one the plurality of color channels; and performing a local white balance to the plurality of normalized images to obtain the plurality of correction matrices, wherein performing the local white balance includes: defining a set of weighting factors based on a figure of merit; computing a plurality of weighted images based on the plurality of normalized images and the set of weighting factors; and computing the plurality of correction matrices based on the plurality of weighted images.

Example 9 is the system of example(s) 7, wherein the operations further comprise: determining a plurality of target source currents using the plurality of correction matrices; and setting a plurality of source currents of the display device to the plurality of target source currents.

Example 10 is a method of improving a color uniformity of a display, the method comprising: capturing a plurality of images of the display of a display device using an image capture device, wherein the plurality of images are captured in a color space, and wherein each of the plurality of images corresponds to one of a plurality of color channels; performing a global white balance to the plurality of images to obtain a plurality of normalized images each corresponding to one the plurality of color channels; and performing a local white balance to the plurality of normalized images to obtain a plurality of correction matrices each corresponding to one of the plurality of color channels, wherein performing the local white balance includes: defining a set of weighting factors based on a figure of merit; computing a plurality of weighted images based on the plurality of normalized images and the set of weighting factors; and computing the plurality of correction matrices based on the plurality of weighted images.

Example 11 is the method of example(s) 10, further comprising: applying the plurality of correction matrices to the display device.

Example 12 is the method of example(s) 10-11, wherein the figure of merit is at least one of: an electrical power consumption; a color error; or a minimum bit-depth.

Example 13 is the method of example(s) 10-12, wherein defining the set of weighting factors based on the figure of merit includes: minimizing the figure of merit by varying the set of weighting factors; and determining the set of weighting factors at which the figure of merit is minimized.

Example 14 is the method of example(s) 10-13, wherein the color space is one of: a CIELUV color space; a CIEXYZ color space; or a sRGB color space.

Example 15 is the method of example(s) 10-14, wherein performing the global white balance to the plurality of images includes: determining target illuminance values in the color space based on a target white point, wherein the plurality of normalized images are computed based on the target illuminance values.

Example 16 is the method of example(s) 15, wherein the plurality of correction matrices are computed further based on the target illuminance values.

Example 17 is the method of example(s) 10-16, wherein the display is a diffractive waveguide display.

Example 18 is a non-transitory computer-readable medium comprising instructions that, when executed by one or more processors, cause the one or more processors to perform operations comprising: capturing a plurality of images of a display of a display device using an image capture device, wherein the plurality of images are captured in a color space, and wherein each of the plurality of images corresponds to one of a plurality of color channels; performing a global white balance to the plurality of images to obtain a plurality of normalized images each corresponding to one the plurality of color channels; and performing a local white balance to the plurality of normalized images to obtain a plurality of correction matrices each corresponding to one of the plurality of color channels, wherein performing the local white balance includes: defining a set of weighting factors based on a figure of merit; computing a plurality of weighted images based on the plurality of normalized images and the set of weighting factors; and computing the plurality of correction matrices based on the plurality of weighted images.

Example 19 is the non-transitory computer-readable medium of example(s) 18, wherein the operations further comprise: applying the plurality of correction matrices to the display device.

Example 20 is the non-transitory computer-readable medium of example(s) 18-19, wherein the figure of merit is at least one of: an electrical power consumption; a color error; or a minimum bit-depth.

Example 21 is the non-transitory computer-readable medium of example(s) 18-20, wherein defining the set of weighting factors based on the figure of merit includes: minimizing the figure of merit by varying the set of weighting factors; and determining the set of weighting factors at which the figure of merit is minimized.

Example 22 is the non-transitory computer-readable medium of example(s) 18-21, wherein the color space is one of: a CIELUV color space; a CIEXYZ color space; or a sRGB color space.

Example 23 is the non-transitory computer-readable medium of example(s) 18-22, wherein performing the global white balance to the plurality of images includes: determining target illuminance values in the color space based on a target white point, wherein the plurality of normalized images are computed based on the target illuminance values.

Example 24 is the non-transitory computer-readable medium of example(s) 23, wherein the plurality of correction matrices are computed further based on the target illuminance values.

Example 25 is the non-transitory computer-readable medium of example(s) 18-24, wherein the display is a diffractive waveguide display.

Example 26 is a system comprising: one or more processors; and a non-transitory computer-readable medium comprising instructions that, when executed by the one or more processors, cause the one or more processors to perform operations comprising: capturing a plurality of images of a display of a display device using an image capture device, wherein the plurality of images are captured in a color space, and wherein each of the plurality of images corresponds to one of a plurality of color channels; performing a global white balance to the plurality of images to obtain a plurality of normalized images each corresponding to one the plurality of color channels; and performing a local white balance to the plurality of normalized images to obtain a plurality of correction matrices each corresponding to one of the plurality of color channels, wherein performing the local white balance includes: defining a set of weighting factors based on a figure of merit; computing a plurality of weighted images based on the plurality of normalized images and the set of weighting factors; and computing the plurality of correction matrices based on the plurality of weighted images.

Example 27 is the system of example(s) 26, wherein the operations further comprise: applying the plurality of correction matrices to the display device.

Example 28 is the system of example(s) 26-27, wherein the figure of merit is at least one of: an electrical power consumption; a color error; or a minimum bit-depth.

Example 29 is the system of example(s) 26-28, wherein defining the set of weighting factors based on the figure of merit includes: minimizing the figure of merit by varying the set of weighting factors; and determining the set of weighting factors at which the figure of merit is minimized.

Example 30 is the system of example(s) 26-29, wherein the color space is one of: a CIELUV color space; a CIEXYZ color space; or a sRGB color space.

Example 31 is the system of example(s) 26-30, wherein performing the global white balance to the plurality of images includes: determining target illuminance values in the color space based on a target white point, wherein the plurality of normalized images are computed based on the target illuminance values.

Example 32 is the system of example(s) 31, wherein the plurality of correction matrices are computed further based on the target illuminance values.

Example 33 is the system of example(s) 26-32, wherein the display is a diffractive waveguide display.

Numerous benefits are achieved by way of the present disclosure over conventional techniques. For example, embodiments described herein are able to correct for high levels of color non-uniformity. Embodiments may also consider eye position, electrical power, and bit-depth for robustness in a variety of applications. Embodiments may further ease the manufacturing requirements and tolerances (such as TTV (related to wafer thickness variation), diffractive structure fidelity, layer-to-layer alignment, projector-to-layer alignment, etc.) needed to produce a display of a certain level of color uniformity. Techniques described herein are not only applicable to displays employing diffractive waveguide eyepieces, but can be used for a wide variety of displays such as reflective holographic-optical-element (HOE) displays, reflective combiner displays, bird-bath combiner displays, embedded reflector waveguide displays, among other possibilities.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

Several of the appended figures include colored features that have been converted into grayscale for reproduction purposes. Applicant reserves the right to reintroduce the colored features at a later time.

DETAILED DESCRIPTION OF SPECIFIC EMBODIMENTS

Many types of displays, including augmented reality (AR) displays, suffer from color non-uniformity across the user's field-of-view (FoV). The source of these non-uniformities varies by display technology, but are particularly troublesome for diffractive waveguide eyepieces. For these displays, a significant contributor to color non-uniformity is part-to-part variation of the local thickness variation profile of the eyepiece substrate, which can lead to large variations in the output image uniformity pattern. In eyepieces which contain multiple layers, the uniformity patterns of the display channels (e.g., red, green, and blue display channels) can have significantly different uniformity patterns, which leads to color non-uniformity. Other factors which may result in color non-uniformity include variations in the grating structure across the eyepiece, variations in the alignment of optical elements within the system, systematic differences between the light paths of the display channels, among other possibilities.

Embodiments of the present disclosure provide techniques for improving the color uniformity of displays and display devices. Such techniques may correct the color non-uniformity produced by many displays including AR displays such that, after correction, the user may see more uniform color across the entire FoV of the display. In some embodiments, techniques may include a calibration process and algorithm which generates a correction matrix corresponding to a value between 0 and 1 for each pixel and color channel used by a spatial-light modulator (SLM). The generated correction matrices may be multiplied with each image frame sent to the SLM to improve the color uniformity.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1:
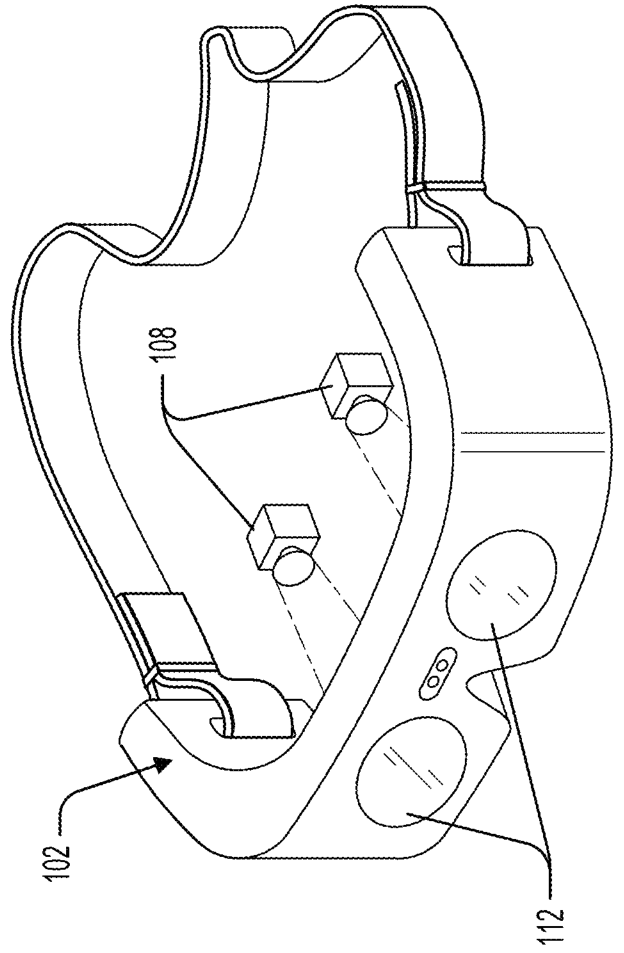
FIG. 1 illustrates an example display calibration scheme.

FIG. 1 illustrates an example display calibration scheme, according to some embodiments of the present disclosure. In the illustrated example, cameras 108 are positioned at user eye positions relative to displays 112 of a wearable device 102. In some instances, cameras 108 can be installed adjacent to wearable device 102 in a station. Cameras 108 can be used to measure the wearable device's display output for the left and right eyes concurrently or sequentially. While each of cameras 108 is shown as being positioned at a single eye position to simplify the illustration, it should be understood that each of cameras 108 can be shifted to several positions to account for possible color shift with changes in eye position, inter-pupil distance, and movement of the user, etc. Merely as an example, each of cameras 108 (or similarly wearable device 102) can be shifted in three lateral locations, at −3 mm, 0 mm, and +3 mm. In addition, the relative angles of wearable device 102 with respect to each of cameras 108 can also be varied to provide additional calibration conditions.

Each of displays 112 may include one or more light sources, such as light-emitting diodes (LEDs). In some embodiments, a liquid crystal on silicon (LCOS) can be used to provide the display images. The LCOS may be built into wearable device 102. During calibration, image light can be projected by wearable device 102 in field sequential color, for example, in the sequence of red, green, and blue. In a field-sequential color system, the primary color information is transmitted in successive images, which relies on the human visual system to fuse the successive images into a color picture. Each of cameras 108 may capture images in the camera's color space and provide the data to a calibration workstation. Prior to further processing of the captured images, the color space may be converted from a first color space (e.g., the camera's color space) to a second color space. For example, the captured images may be converted from the camera's RGB space to the XYZ color space.

In some embodiments, each of displays 112 is caused to display a separate image for each light source for producing a target white point. While each of displays 112 is displaying each image, the corresponding camera may capture the displayed image. For example, a first image may be captured of a display while displaying a red image using a red illumination source, a second image may be captured of the same display while displaying a green image using a green illumination source, and a third image may be captured of the same display while displaying a blue image using a blue illumination source. The three captured images, along with three captured images for the other display, may then be processed in accordance with the described embodiments.

Figure 2:
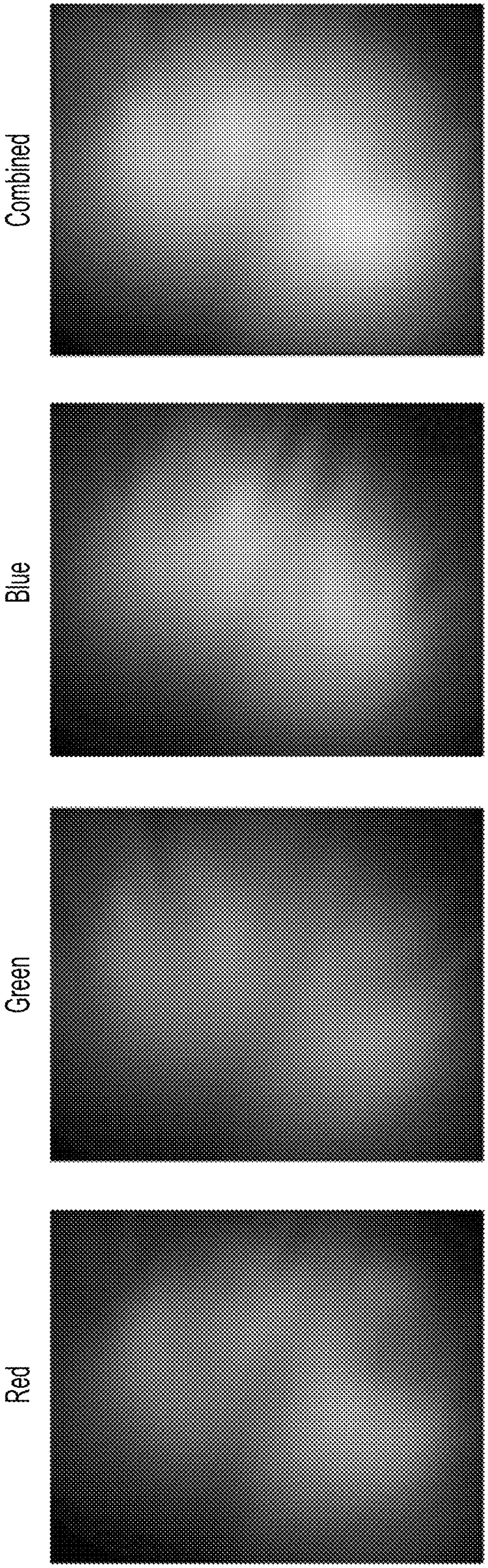
FIG. 2 illustrates examples of luminance uniformity patterns which can occur for different color channels in a diffractive waveguide eyepiece.

FIG. 2 illustrates examples of luminance uniformity patterns which can occur for different color channels in a diffractive waveguide eyepiece, according to some embodiments of the present disclosure. From left to right, luminance uniformity patterns are shown for red, green, and blue display channels in the diffractive waveguide eyepiece. The combination of the individual display channels results in the color uniformity image on the far right, which exhibits non-uniform color throughout. In the illustrated examples, images (gamma=2.2) were taken through a diffractive waveguide eyepiece consisting of 3 layers (one for each display channel). Each image corresponds to a 45°×55° FoV. FIG. 2 includes colored features that have been converted into grayscale for reproduction purposes.

Figure 3:
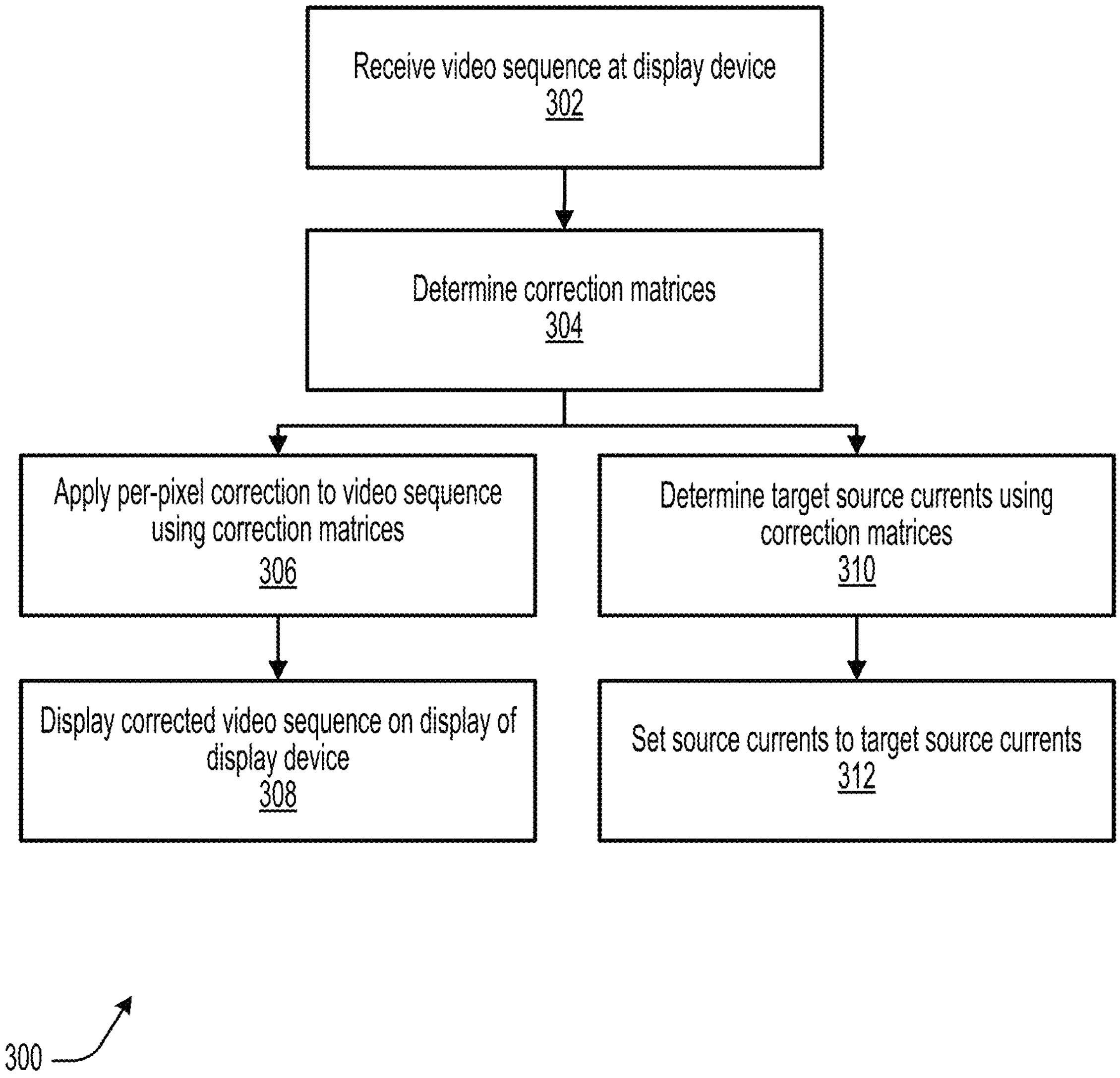
FIG. 3 illustrates a method of displaying a video sequence comprising a series of image on a display.

FIG. 3 illustrates a method 300 of displaying a video sequence comprising a series of image on a display, according to some embodiments of the present disclosure. One or more steps of method 300 may be omitted during performance of method 300, and steps of method 300 need not be performed in the order shown. One or more steps of method 300 may be performed by one or more processors. Method 300 may be implemented as a computer-readable medium or computer program product comprising instructions which, when the program is executed by one or more computers, cause the one or more computers to carry out the steps of method 300.

At step 302, a video sequence is received at the display device. The video sequence may include a series of images. The video sequence may include a plurality of color channels, with each of the color channels corresponding to one of a plurality of illumination sources of the display device. For example, the video sequence may include red, green, and blue color channels and the display device may include red, green, and blue illumination sources. The illumination sources may be LEDs.

At step 304, a plurality of correction matrices are determined. Each of the plurality of correction matrices may correspond to one of the plurality of color channels. For example, the plurality of correction matrices may include red, green, and blue correction matrices.

At step 306, a per-pixel correction is applied to each of the plurality of color channels of the video sequence using a correction matrix of the plurality of correction matrices. For example, the red correction matrix may be applied to the red color channel of the video sequence, the green correction matrix may be applied to the green color channel of the video sequence, and the blue correction matrix may be applied to the blue color channel of the video sequence. In some embodiments, applying the per-pixel correction causes a corrected video sequence having the plurality of color channels to be generated.

At step 308, the corrected video sequence is displayed on the display of the display device. For example, the corrected video sequence may be sent to a projector (e.g., LCOS) of the display device. The projector may project the corrected video sequence onto the display. The display may be a diffractive waveguide display.

At step 310, a plurality of target source currents are determined. Each of the target source currents may correspond to one of the plurality of illumination sources and one of the plurality of color channels. For example, the plurality of target source currents may include red, green, and blue target source currents. In some embodiments, the plurality of target source currents are determined based on the plurality of correction matrices.

At step 312, a plurality of source currents of the display device are set to the plurality of target source currents. For example, a red source current (corresponding to the amount of electrical current flowing through the red illumination source) may be set to the red target current by adjusting the red source current toward or equal to the value of the red target current, a green source current (corresponding to the amount of electrical current flowing through the green illumination source) may be set to the green target current by adjusting the green source current toward or equal to the value of the green target current, and a blue source current (corresponding to the amount of electrical current flowing through the blue illumination source) may be set to the blue target current by adjusting the blue source current toward or equal to the value of the blue target current.

Figure 4:
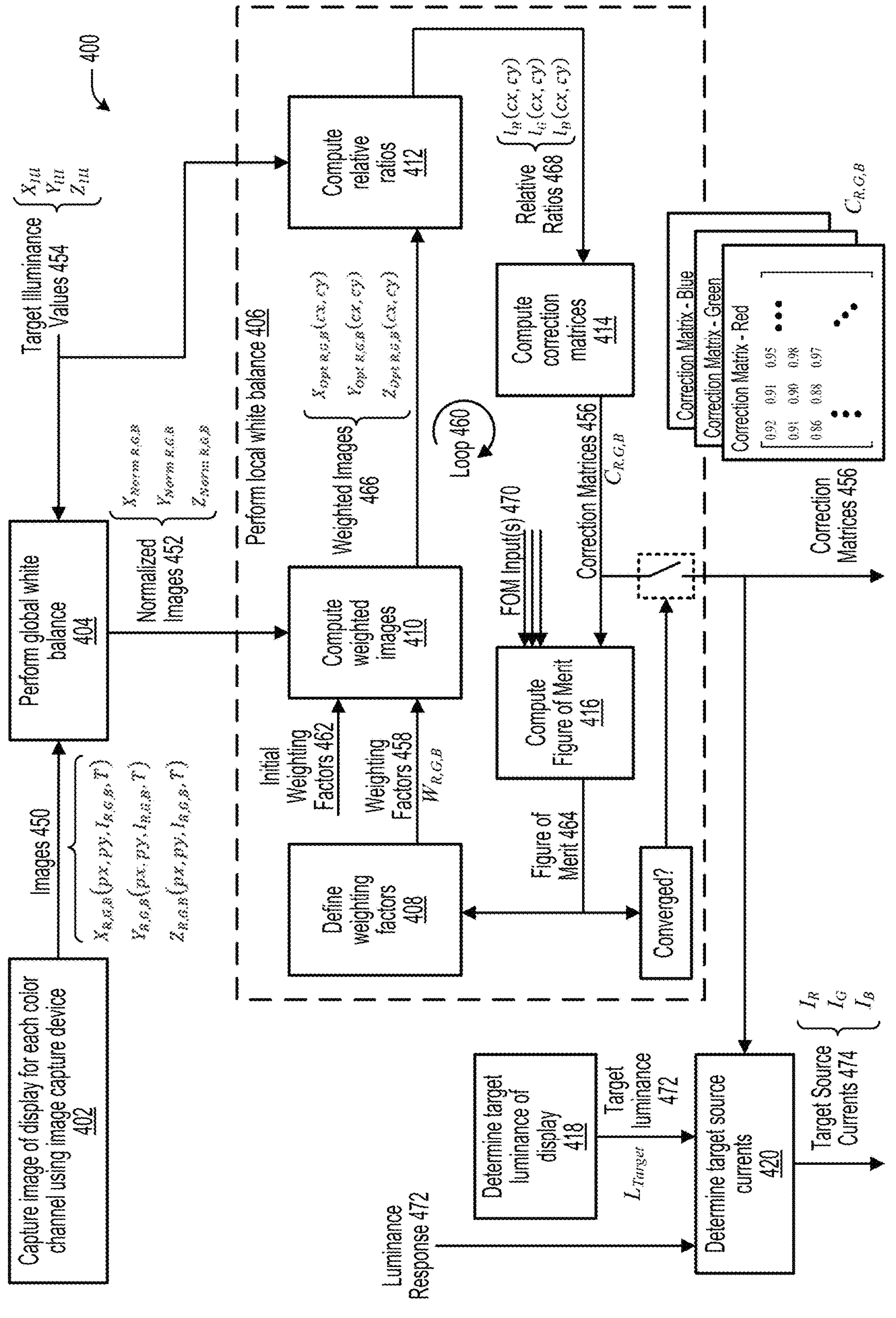
FIG. 4 illustrates a method of improving the color uniformity of a display.

FIG. 4 illustrates a method 400 of improving the color uniformity of a display, according to some embodiments of the present disclosure. One or more steps of method 400 may be omitted during performance of method 400, and steps of method 400 need not be performed in the order shown. One or more steps of method 400 may be performed by one or more processors. Method 400 may be implemented as a computer-readable medium or computer program product comprising instructions which, when the program is executed by one or more computers, cause the one or more computers to carry out the steps of method 400. Steps of method 400 may incorporate and/or may be used in conjunction with one or more steps of the various other methods described herein.

The amount of color non-uniformity in the display can be characterized in terms of the shift in color coordinates from a desired white point when a white image is shown on the display. To capture the amount of variation of color across the FoV, the root-mean-square (RMS) of deviation from a target white point (e.g., D65) of the color coordinate at each pixel in the FoV can be calculated. When using the CIELUV color space, the RMS color error may be calculated as:

$$RMS\ \text{Color Error} = \sqrt{\frac{\left(\sum_{px}\left((u'_{px} - D65_{u'})^2 + (v'_{px} - D65_{v'})^2\right)\right)}{n_{px}}}$$

where $u'_{px}$ is the u' value at pixel px, $v'_{px}$ is the v' value at pixel px, $D65_{u'}$ is the u' value for the D65 white point, $D6.5_{v'}$ is the v' value for the D65 white point, and $n_{px'}$ is the number of pixels.

One goal of color uniformity correction may be to minimize the RMS color error as much as possible over a range of eye positions within the eye box while minimizing negative impacts to display power consumption, display brightness, and color bit-depth. The outputs of method 400 may be a set of correction matrices $C_{R,G,B}$ containing values between 0 and 1 at each pixel of the display for each color channel and a plurality of target source currents $I_R$, $I_G$, and $I_B$.

A set of input data may be utilized to describe the output of the display in sufficient detail to correct the color non-uniformity, white-balance the display, and minimize power consumption. In some embodiments, the set of input data may include a map of the CIE XYZ tristimulus values across the FoV, and data that relates the luminance of each display channel to the electrical drive properties of the illumination source. This information may be collected and processed as described below.

At step 402, a plurality of images (e.g., images 450) are captured of the display using an image capture device. Each of the plurality of images may correspond to one of a plurality of color channels. For example, a first image may be captured of the display while displaying using a first illumination source corresponding to a first color channel, a second image may be captured of the display while displaying using a second illumination source corresponding to a second color channel, and a third image may be captured of the display while displaying using a third illumination source corresponding to a third color channel.

The plurality of images may be captured in a particular color space. For example, each pixel of each image may include values for the particular color space. The color space may be a CIELUV color space, a CIEXYZ color space, a sRGB color space, or a CIELAB color space, among other possibilities. For example, each pixel of each image may include CIE XYZ tristimulus values. The values may be captured across the FoV by a colorimeter, a spectrophotometer, or a calibrated RGB camera, among other possibilities. In some examples, if each color channel does not show strong variations of chromaticity across the FoV, a simpler option of combining the uniformity pattern captured by a monochrome camera with a measurement of chromaticity at a single field point may also be used. The resolution needed may depend on the angular frequency of color non-uniformity in the display. To relate the output of the display to electrical drive properties of the illumination source, the output power or luminance of each display channel may be characterized while varying the current and temperature of the illumination source.

The XYZ tristimulus images may be denoted as:

$$X_{R,G,B}(px,py,I_{R,G,B},T)$$

$$Y_{R,G,B}(px,py,I_{R,G,B},T)$$

$$Z_{R,G,B}(px,py,I_{R,G,B},T)$$

where X, Y, and Z are each a tristimulus value, R refers to the red color/display channel, G refers to the green color/display channel, B refers to the blue color/display channel, px and py are pixels in the FoV, I is the illumination source drive current, and T is the characteristic temperature of the display or display device.

The electrical power used to drive the illumination sources may be a function of current and voltage. The current-voltage relationship may be known and $P(I_R, I_G, I_B, T)$ can be used to represent electrical power. The relationship between illumination source currents, characteristic temperature, and average display luminance can be used and referenced using $L_{Out\ R,G,B}(I_{R,G,B},T)$.

At step 404, a global white balance is performed to the plurality of images to obtain a plurality of normalized images (e.g., normalized images 452). Each of the plurality of normalized images may correspond to one of a plurality of color channels. To perform the global white balance (or to globally white balance the display or display channels), in some embodiments, the averages of the tristimulus images of the FoV may be increased or decreased toward a set of target illuminance values 454 denoted as $X_{Ill}$, $Y_{Ill}$, $Z_{Ill}$. For the D65 target white point (at 100 nits luminance), target illuminance values 454 have tristimulus values of:

$$X_{Ill}=95.047$$

$$Y_{Ill}=100$$

$$Z_{Ill}=108.883$$

The mean measured tristimulus value (at some test conditions for current and temperature) for each color/display channel may be calculated using:

$$\overline{X}_{R,G,B} = \frac{\text{Mean }(X_{R,G,B}(px, py))}{\text{Mean }(Y_{R,G,B}(px, py))}$$

$$\overline{Y}_{R,G,B} = 1$$

$$\overline{Z}_{R,G,B} = \frac{\text{Mean }(Z_{R,G,B}(px, py))}{\text{Mean }(Y_{R,G,B}(px, py))}$$

Next, the target luminance of each color/display channel may be solved for using the matrix equation:

$$\begin{bmatrix} L_R \\ L_G \\ L_B \end{bmatrix} = \begin{pmatrix} \overline{X}_R & \overline{Z}_G & \overline{X}_B \\ \overline{Y}_R & \overline{Y}_G & \overline{Y}_B \\ \overline{Z}_R & \overline{Z}_G & \overline{Z}_B \end{pmatrix}^{-1} \begin{bmatrix} X_{Ill} \\ Y_{Ill} \\ Z_{Ill} \end{bmatrix}$$

Using the globally balanced luminance of each color/display channel, normalized images 452 can be calculated by normalizing images 450 as follows:

$$X_{NormR,G,B} = L_{R,G,B}\frac{X_{R,G,B}(px,\ py)}{\text{Mean }(Y_{R,G,B}(px,\ py))}$$

$$Y_{NormR,G,B} = L_{R,G,B}\frac{Y_{R,G,B}(px,\ py)}{\text{Mean }(Y_{R,G,B}(px,\ py))}$$

$$Z_{NormR,G,B} = L_{R,G,B}\frac{Z_{R,G,B}(px,\ py)}{\text{Mean }(Y_{R,G,B}(px,\ py))}$$

At step 406, a local white balance is performed to the plurality of normalized images to obtain a plurality of correction matrices (e.g., correction matrices 456). Each of the plurality of correction matrices may correspond to one of the plurality of color channels. To perform the local white balance, the correction matrices may be optimized in a way that minimizes the total power consumption for hitting a globally white balanced luminance target.

At step 408, a set of weighting factors (e.g., weighting factors 458) are defined, denoted as $W_{R,G,B}$. Each of the set of weighting factors may correspond to one of the plurality of color channels. The set of weighting factors may be defined based on a figure of merit (e.g., figure of merit 464). During each iteration through loop 460, the set of weighting factors are used to bias the correction matrix in favor of the color/display channel with lowest efficiency. For example, if the efficiency of the red channel is substantially lower than green and blue, it is desirable for the correction matrix for red to have a value of 1 across the entire FoV, while lower values would be used in the correction matrices for green and blue channels to achieve better local white balancing.

At step 410, a plurality of weighted images (e.g., weighted images 466) are computed based on the plurality of normalized images and the set of weighting factors. Each of the plurality of weighted images may correspond to one of the plurality of color channels. The plurality of weighted images may be denoted as $X_{Opt\ R,G,B}$, $Y_{Opt\ R,G,B}$, $Z_{Opt\ R,G,B}$. As shown in the illustrated example, weighting factors 458 may be used as the set of weighting factors during each iteration through loop 460 except for the first iteration, during which initial weighting factors 462 are used. The resolution used for local white balancing is a parameter that may be chosen, and does not need to match the resolution of the display device (e.g., SLM). In some embodiments, after correction matrices 456 are calculated, an interpolation step may be added to match the size of the computed correction matrices with the resolution of the SLM.

Weighted images 466 may be computed as:

$$X_{Opt\ R,G,B}(cx,cy)=W_{R,G,B}\cdot imresize(X_{Norm\ R,G,B}(cx,cy),[n_{cx},n_{cy}])$$

$$Y_{Opt\ R,G,B}(cx,cy)=W_{R,G,B}\cdot imresize(Y_{Norm\ R,G,B}(cx,cy),[n_{cx},n_{cy}])$$

$$Z_{Opt\ R,G,B}(cx,cy)=W_{R,G,B}\cdot imresize(Z_{Norm\ R,G,B}(cx,cy),[n_{cx},n_{cy}])$$

where cx and cy are coordinates in the correction matrices with $n_{cx}$ and $n_{cy}$ elements.

At step 412, a plurality of relative ratio maps (e.g., relative ratios 468) are computed based on the plurality of weighted images and the plurality of target illuminance values. Each of the plurality of relative ratio maps may correspond to one of the plurality of color channels. The plurality of relative ratio maps may be denoted as $l_R$ (cx, cy), $l_G$(cx, cy), $l_B$ (cx, cy). For each pixel in the correction (cx, cy), the relative ratios of the color channel required to hit a target white point can be determined. Similar to the process for global correction, relative ratios 468 can be computed as follows:

$$\begin{bmatrix} l_R(cx,\ cy) \\ l_G(cx,\ cy) \\ l_B(cx,\ cy) \end{bmatrix} = \begin{pmatrix} X_{Opt\ R}(cx,\ cy) & X_{Opt\ G}(cx,\ cy) & X_{Opt\ B}(cx,\ cy) \\ Y_{Opt\ R}(cx,\ cy) & Y_{Opt\ G}(cx,\ cy) & Y_{Opt\ B}(cx,\ cy) \\ Z_{Opt\ R}(cx,\ cy) & Z_{Opt\ G}(cx,\ cy) & Z_{Opt\ B}(cx,\ cy) \end{pmatrix}^{-1} \begin{bmatrix} X_{Ill} \\ Y_{Ill} \\ Z_{Ill} \end{bmatrix}$$

The quantities $l_{R,G,B}$ can be interpreted as the relative weights of the pixel required to hit a target white balance (e.g., D65). Since a global white balance correction was already performed resulting in normalized images 452, if the images were perfectly uniform over cx and cy, relative ratios 468 would be computed as $l_R=l_G=l_B$. Due to the non-uniformity over cx and cy, variations may exist between $l_R$, $l_G$ and $l_B$.

At step 414, the plurality of correction matrices are computed based on the plurality of relative ratio maps. In some embodiments, the correction matrix for each color channel can be computed at each pixel as:

$$C_{R,G,B} = \frac{l_{R,G,B}(cx,\ cy)}{\max(l_R(cx,\ cy),\ l_G(cx,\ cy),\ l_B(cx,\ cy))}$$

With this definition of the correction matrix, at every point in cx, cy, the relative ratios of the red, green, and blue channel will correctly generate a target white point (e.g., D65). Additionally, at least one color channel will have a value of 1 at every cx, cy, which minimizes optical loss, which is the reduction in luminance a user sees due to the correction of color non-uniformity.

At step 416, a figure of merit (e.g., figure of merit 464) is computed based on the plurality of correction matrices and one or more figure of merit inputs (e.g., figure of merit input(s) 470). The computed figure of merit is used in conjunction with step 408 to compute the set of weighting factors for the next iteration through loop 460. As an example, one figure of merit to minimize is the electrical power consumption. The optimization can be described in the following way:

$$(W_R,W_G,W_B)=fmin(FOM(X_{R,G,B},Y_{R,G,B},Z_{R,G,B},L_{Out\ R,G,B}(I_{R,G,B})),W_{R0},W_{G0},W_{B0})$$

where fmin is a multivariable optimization function, FOM is the figure of merit function, and $W_{R0}$, $W_{G0}$, $W_{B0}$ are weighting factors from the previous iteration or initial estimates. During each iteration through loop 460, it may be determined whether the computed figure of merit has converged, in which case method 400 may exit loop 460 and output correction matrices 456.

Examples of figures of merit that may be used include: 1) electrical power consumption, $P(I_R.\ I_G,\ l_B)$, 2) a combination of electrical power consumption and RMS color error over eye positions (in this case, the angular frequency of the low-pass filter in the correction matrix may be included in the optimization), and 3) a combination of electrical power consumption, RMS color error, and minimum bit-depth, among other possibilities.

In many system configurations, the correction matrix may reduce the maximum bit-depth of pixels in the display device. Lower values of the correction matrix may result in lower bit-depth, while a value of 1 would leave the bit-depth unchanged. An additional constraint may be the desire to operate in the linear regime of the SLM. Noise can occur when a device such as an LCoS has a response that is less predictable at lower or higher gray levels due to liquid crystal (LC) switching (which is the dynamic optical response of the LC due to the electronic video signal), temperature effects, or electronic noise. A constraint may be placed on the correction matrix to avoid reducing bit-depth below a desired threshold or operating in an undesirable regime of the SLM, and the impact on the RMS color error can be included in the optimization.

In some embodiments, the global white balance may be redone and required source currents may be calculated with the newly generated correction matrices applied. The target luminance for each channel, $L_{R,G,B}$, was previously calculated. However, an effective efficiency due to the correction matrix $\eta_{Correction\ R,G,B}$, may be applied. The effective efficiency may be computed as follows:

$$\eta_{Correction\ R,G,B} = \frac{\text{Mean }(Y_{R,G,B}(px, py) \cdot C_{R,G,B}(px, py))}{\text{Mean }(Y_{R,G,B}(px, py))}$$

where the •operator signifies element-wise multiplication.

The luminance curves versus current (and temperature if necessary), also referred to as luminance response 472, may be updated using:

$$L_{Corrected\ R,G,B} = \eta_{Correction\ R,G,B} L_{Out\ R,G,B}(I_{R,G,B})$$

The currents $I_{R,G,B}$ needed to reach the previously defined target D65 luminance values for each color channel, $L_{R,G,B}$ can now be found from luminance response 472 which includes the $L_{Corrected\ R,G,B}$ vs $I_{R,G,B}$ curves. With the currents known, the efficacy of each color channel and total electrical power consumption $P(I_R, I_G, I_B)$ can also be found.

In some embodiments, once the optimal weighting factors are found, the same method described above can be followed a final time to produce the optimal correction matrices. Using $L_{corrected\ R,G,B}$ $(I_{R,G,B}, T)$, a global white balance can be performed to get the needed illumination source currents for all operating temperatures and target display illuminances.

In some embodiments, the desired luminance of each color channel, $L_{corrected\ R,G,B}$, can be determined using a similar matrix equation as was used to perform the global white balance. However, the target white point tristimulus values $(X_{Ill}, Y_{Ill}, Z_{Ill})$ can now be scaled by the target display luminance, $L_{Target}$. For a D65 white point, this leads to:

$$X_{Ill}(L_{Target}) = 0.95047 L_{Target}$$

$$Y_{Ill}(L_{Target}) = L_{Target}$$

$$Z_{Ill}(L_{Target}) = 1.08883 L_{Target}$$

Other target white points may change the values of $X_{Ill}$, $Y_{Ill}$, $Z_{Ill}$. Now $L_{corrected\ R,G,B}$ can be solved for as follows:

$$\begin{bmatrix} L_{Corrected\ R} \\ L_{Corrected\ G} \\ L_{Corrected\ B} \end{bmatrix} = \begin{pmatrix} \overline{X}_R & \overline{Z}_G & \overline{X}_B \\ \overline{Y}_R & \overline{Y}_G & \overline{Y}_B \\ \overline{Z}_R & \overline{Z}_G & \overline{Z}_B \end{pmatrix}^{-1} \begin{bmatrix} X_{Ill}(L_{Target}) \\ Y_{Ill}(L_{Target}) \\ Z_{Ill}(L_{Target}) \end{bmatrix}$$

where $\overline{X}_{R,G,B}$, $\overline{Y}_{R,G,B}$, $\overline{Z}_{R,G,B}$ are the previously defined mean tristimulus values for each display color channel.

The data relating display luminance to current and temperature is known by the function $L_{Corrected\ R,G,B}(I_{R,G,B}, T)$ which may be included in luminance response 472. This information can also be represented as $I_{R,G,B}(L_{Corrected\ R,G,B}, T)$, which may be included in luminance response 472. Using this as well as the results from the matrix equation above yields the source currents as a function of $L_{Target}$ and temperature, $I_{R,G,B}(L_{Target}, T)$.

At step 418, a target luminance of the display (e.g., target luminance 472) denoted as $L_{Target}$ is determined. In some embodiments, target luminance 472 may be determined by benchmarking the luminance of a wearable device against typical monitor luminances (e.g., against desktop monitors or televisions).

At step 420, a plurality of target source currents (e.g., target source currents 474) denoted as $I_{R,G,B}$ are determined based on the target luminance and the luminance response (e.g. luminance response 472) between the luminance of the display and current (and optionally temperature). In some embodiments, target source currents 474 and correction matrices 456 are the outputs of method 400.

Various techniques may be employed to address the eye-position dependence of correction matrices 456. In a first approach, a low-pass filter may be applied to the correction matrices to reduce sensitivity to eye position. The angular frequency cutoff of the filter can be optimized for a given display. A Gaussian filter with σ=2-10° may be an adequate range for such a filter. In a second approach, images may be acquired at multiple eye-positions using a camera with an entrance pupil diameter of roughly 4 mm, and the average may be used to generate an effective eye box image. The eye box image can be used to generate a correction matrix that will be less sensitive to eye position than an image taken at a particular eye-position.

In a third approach, images may be acquired using a camera with an entrance pupil diameter as large as the designed eye box (~10-20 mm). Again, the eye box image may produce correction matrices less sensitive to eye position than an image taken at a particular eye-position with a 4 mm entrance pupil. In a fourth approach, images may be acquired using a camera with an entrance pupil diameter of roughly 4 mm located at the nominal user's center of eye rotation to reduce sensitivity of the color uniformity correction to eye rotation in the portion of the FoV where the user is fixating. In a fifth approach, images may be acquired at multiple eye positions using a camera with an entrance pupil diameter of roughly 4 mm. Separate correction matrices may be generated for each camera position. These corrections can be used to apply an eye-position dependent color correction using eye-tracking information from a wearable system.

Figure 5:
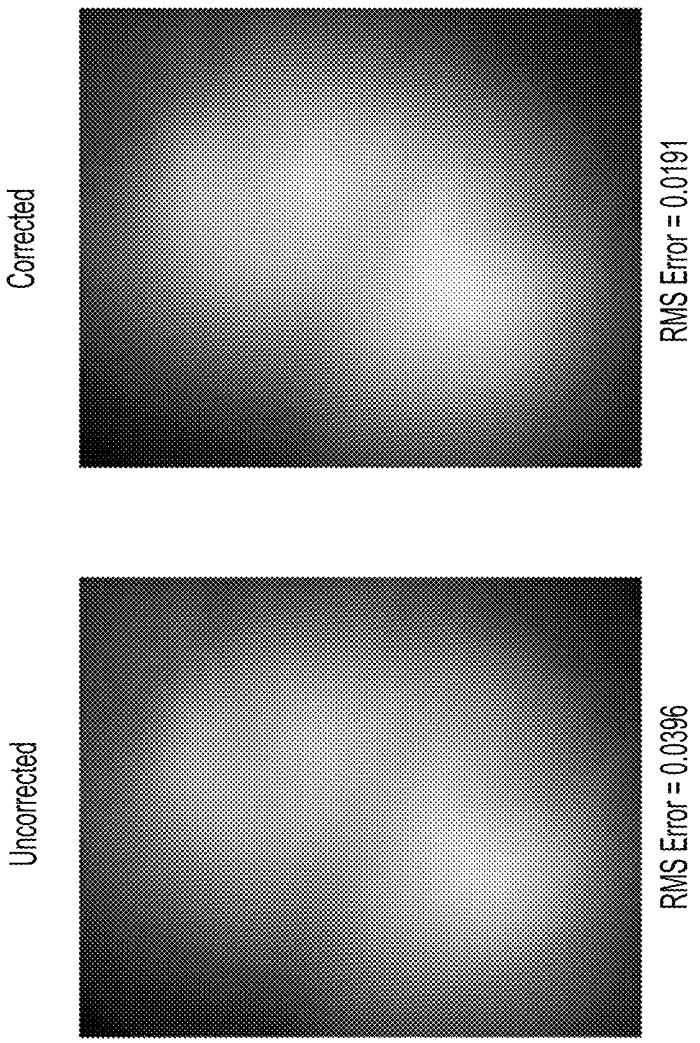
FIG. 5 illustrates an example of improved color uniformity.

FIG. 5 illustrates an example of improved color uniformity using methods 300 and 400, according to some embodiments of the present disclosure. In the illustrated example, the color uniformity correction algorithms were applied to an LED illuminated, LCOS SLM, diffractive waveguide display system. The FoV of the images corresponds to 45°×55°. A Gaussian filter with σ=5° was applied to the correction matrices to reduce eye position sensitivity.

The figure of merit used in the minimization optimization function was electrical power consumption. Both images were taken using a camera with a 4 mm entrance pupil. Prior to and after performing the color uniformity correction algorithms, the RMS color errors were 0.0396 and 0.0191, respectively. Uncorrected and corrected images showing the improvement in color uniformity are shown on the left side and right side of FIG. 5, respectively. FIG. 5 includes colored features that have been converted into grayscale for reproduction purposes.

Figure 6:
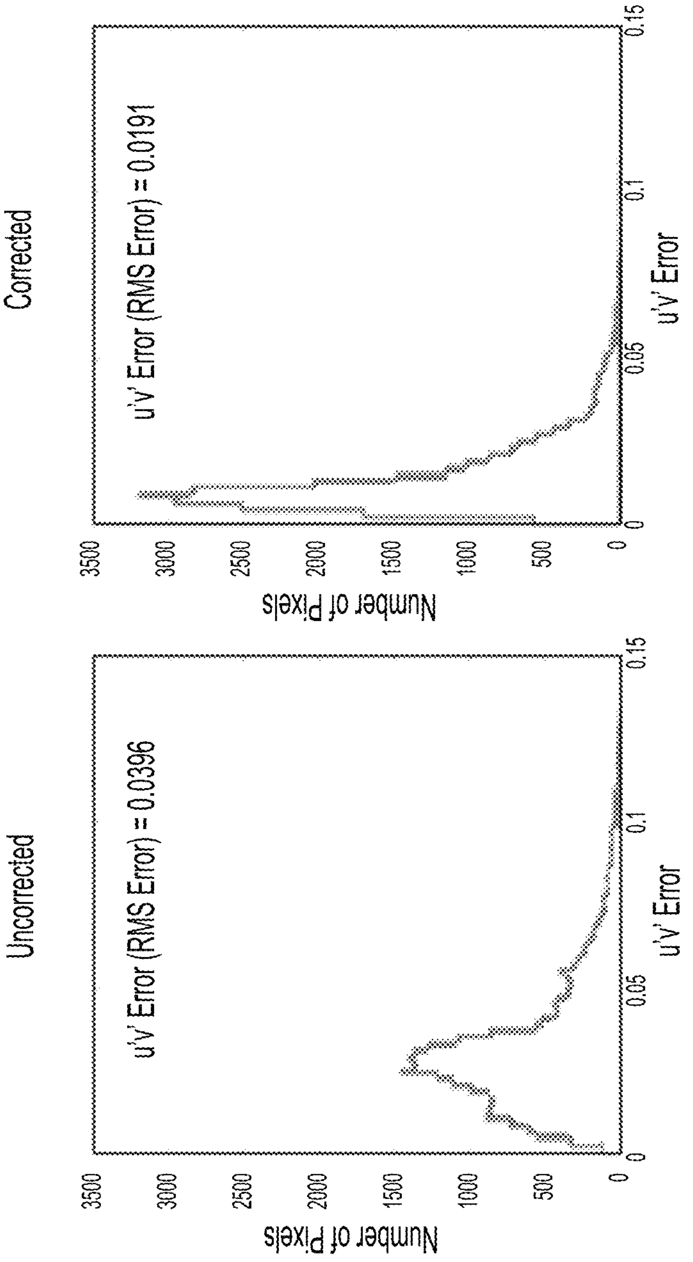
FIG. 6 illustrates a set of error histograms for the example shown in FIG. 5.

FIG. 6 illustrates a set of error histograms for the example shown in FIG. 5, according to some embodiments of the present disclosure. Each of the error histograms shows a number of pixels in each of a set of error ranges in each of the uncorrected and corrected images. The error is the u'v' error from D65 over pixels within the FoV. The illustrated example demonstrates that applying the correction significantly reduces color error.

Figure 7:
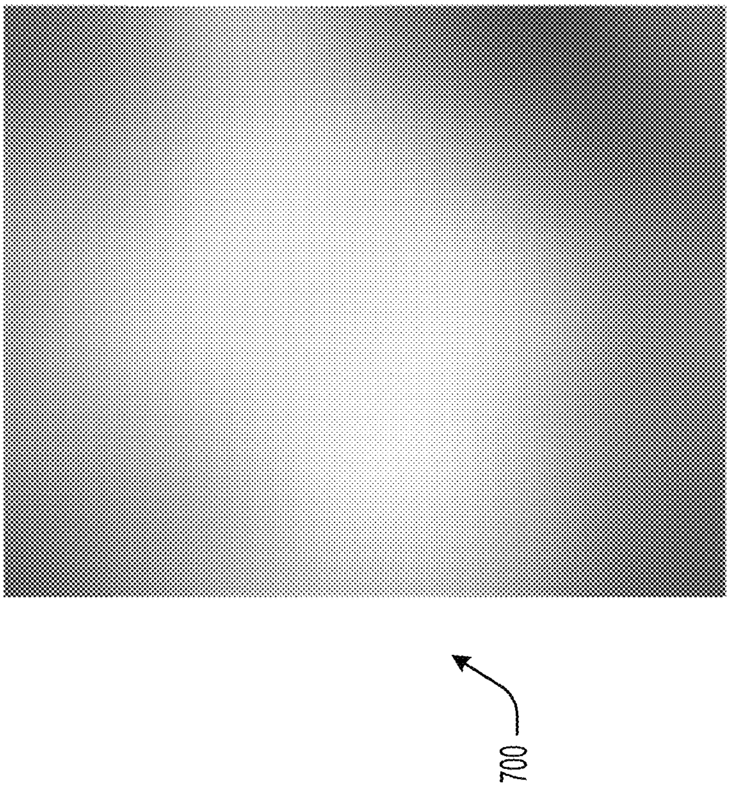
FIG. 7 illustrates an example correction matrix.

FIG. 7 illustrates an example correction matrix 700 viewed as an RGB image, according to some embodiments of the present disclosure. Correction matrix 700 may be a superposition of 3 separate correction matrices $C_{R,G,B}$. In the illustrated example, correction matrix 700 shows that different color channels may exhibit different levels of non-uniformity along different regions of the display. FIG. 7 includes colored features that have been converted into grayscale for reproduction purposes.

Figure 8:
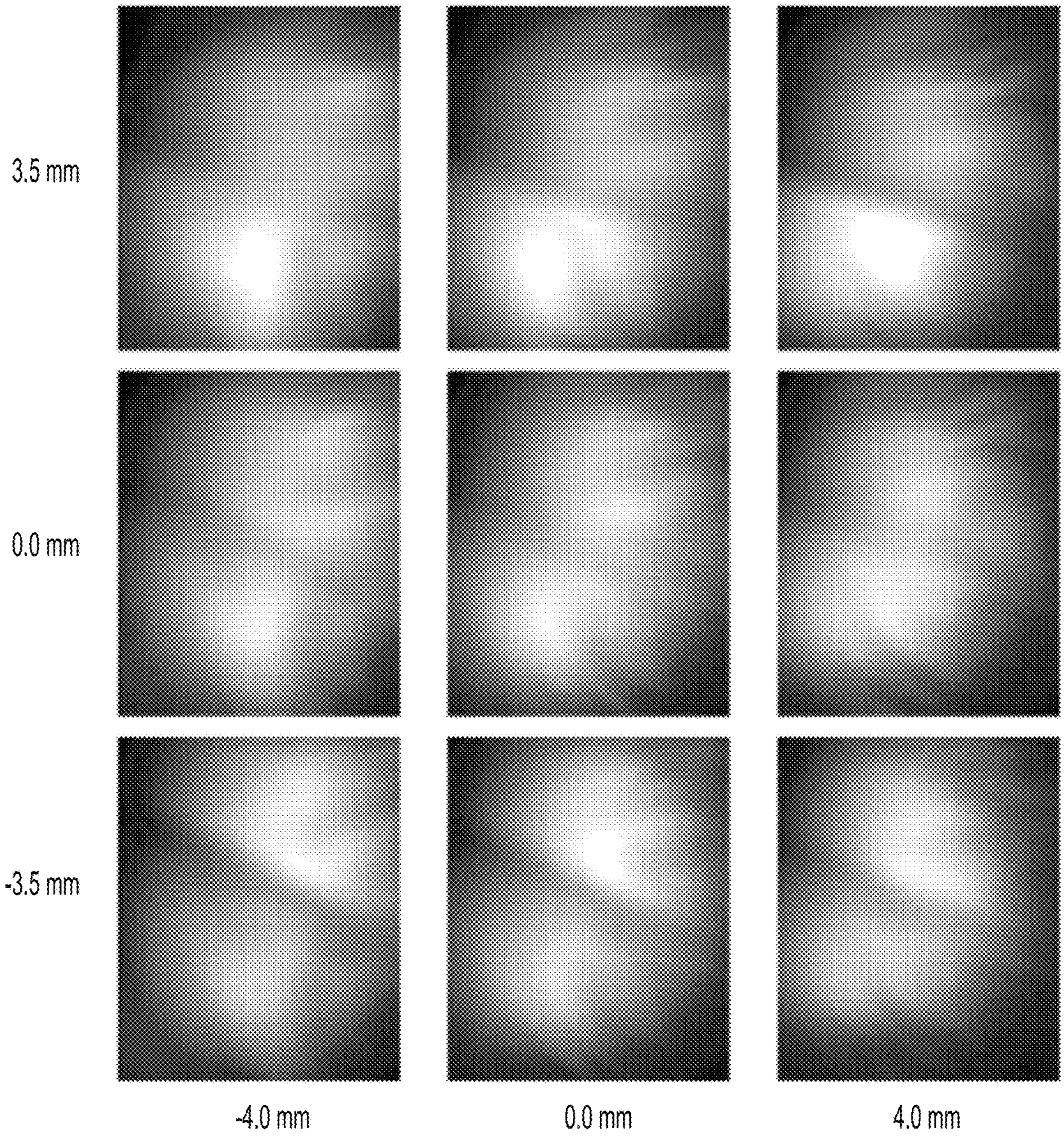
FIG. 8 illustrates examples of luminance uniformity patterns for one display color channel.

FIG. 8 illustrates examples of luminance uniformity patterns for one display color channel, according to some embodiments of the present disclosure. Each image corresponds to a 45°×55° FoV taken at a different eye position within the eye box of a single display color channel. As can be observed in FIG. 8, the luminance uniformity pattern can be dependent on eye position in multiple directions.

Figure 9:
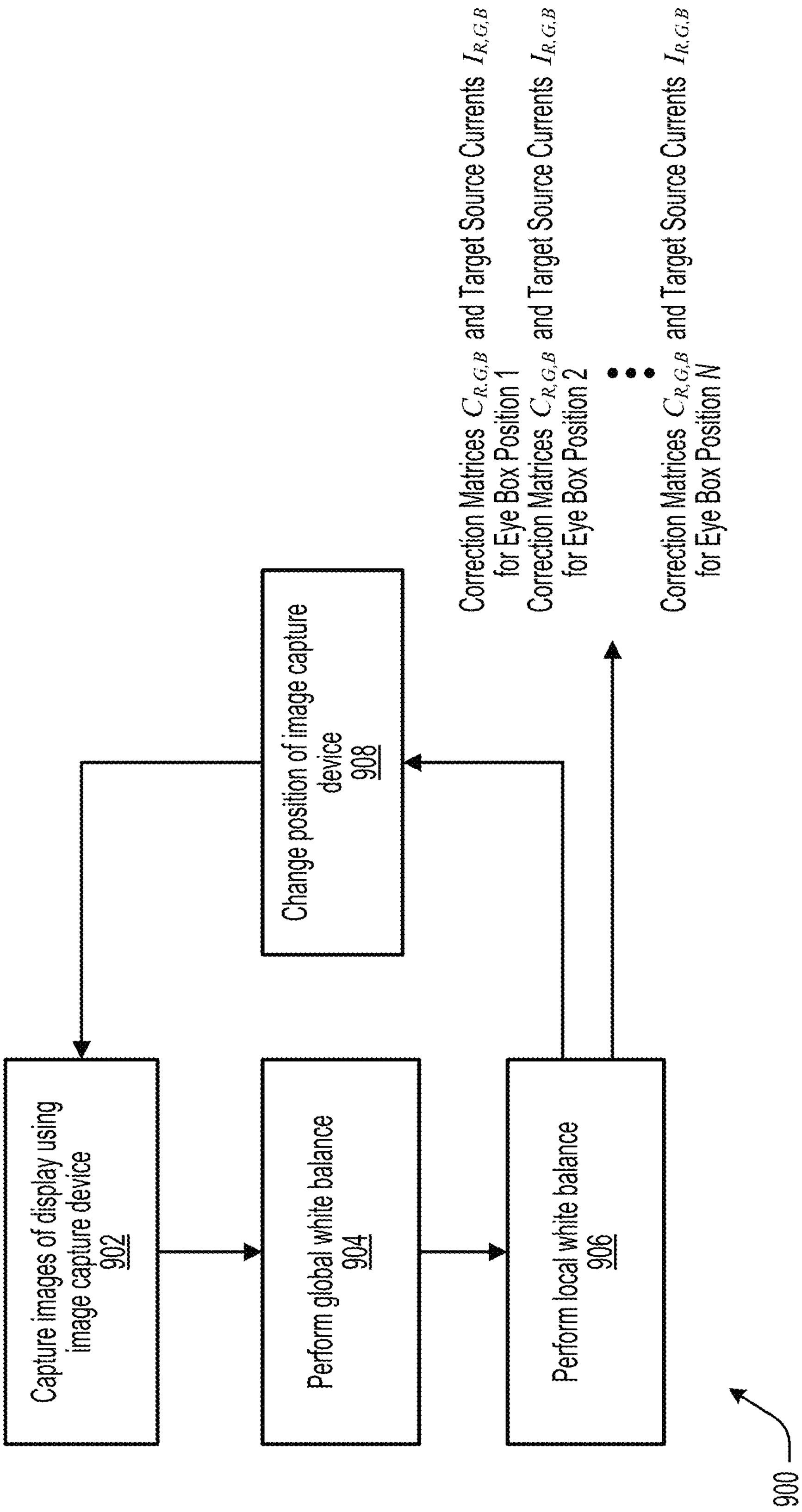
FIG. 9 illustrates a method of improving the color uniformity of a display for multiple eye positions.

FIG. 9 illustrates a method 900 of improving the color uniformity of a display for multiple eye positions within an eye box (or eye box positions), according to some embodiments of the present disclosure. One or more steps of method 900 may be omitted during performance of method 900, and steps of method 900 need not be performed in the order shown. One or more steps of method 900 may be performed by one or more processors. Method 900 may be implemented as a computer-readable medium or computer program product comprising instructions which, when the program is executed by one or more computers, cause the one or more computers to carry out the steps of method 900. Steps of method 900 may incorporate and/or may be used in conjunction with one or more steps of the various other methods described herein.

At step 902, a first plurality of images are captured of the display using an image capture device. The first plurality of images may be captured at a first eye position within an eye box.

At step 904, a global white balance is performed to the first plurality of images to obtain a first plurality of normalized images.

At step 906, a local white balance is performed to the first plurality of normalized images to obtain a first plurality of correction matrices and optionally a first plurality of target source currents, which may be stored in a memory device.

At step 908, the position of the image capture device is changed relative to the display. During the subsequent iteration through steps 902 to 906, a second plurality of images are captured of the display at a second eye position within the eye box, the local white balance is performed to the second plurality of normalized images to obtain a second plurality of correction matrices and optionally a second plurality of target source currents, which may be stored in the memory device. Similarly, during the subsequent iteration through steps 902 to 906, a third plurality of images are captured of the display at a third eye position within the eye box, the local white balance is performed to the third plurality of normalized images to obtain a third plurality of correction matrices and optionally a third plurality of target source currents, which may be stored in the memory device.

Figure 10:
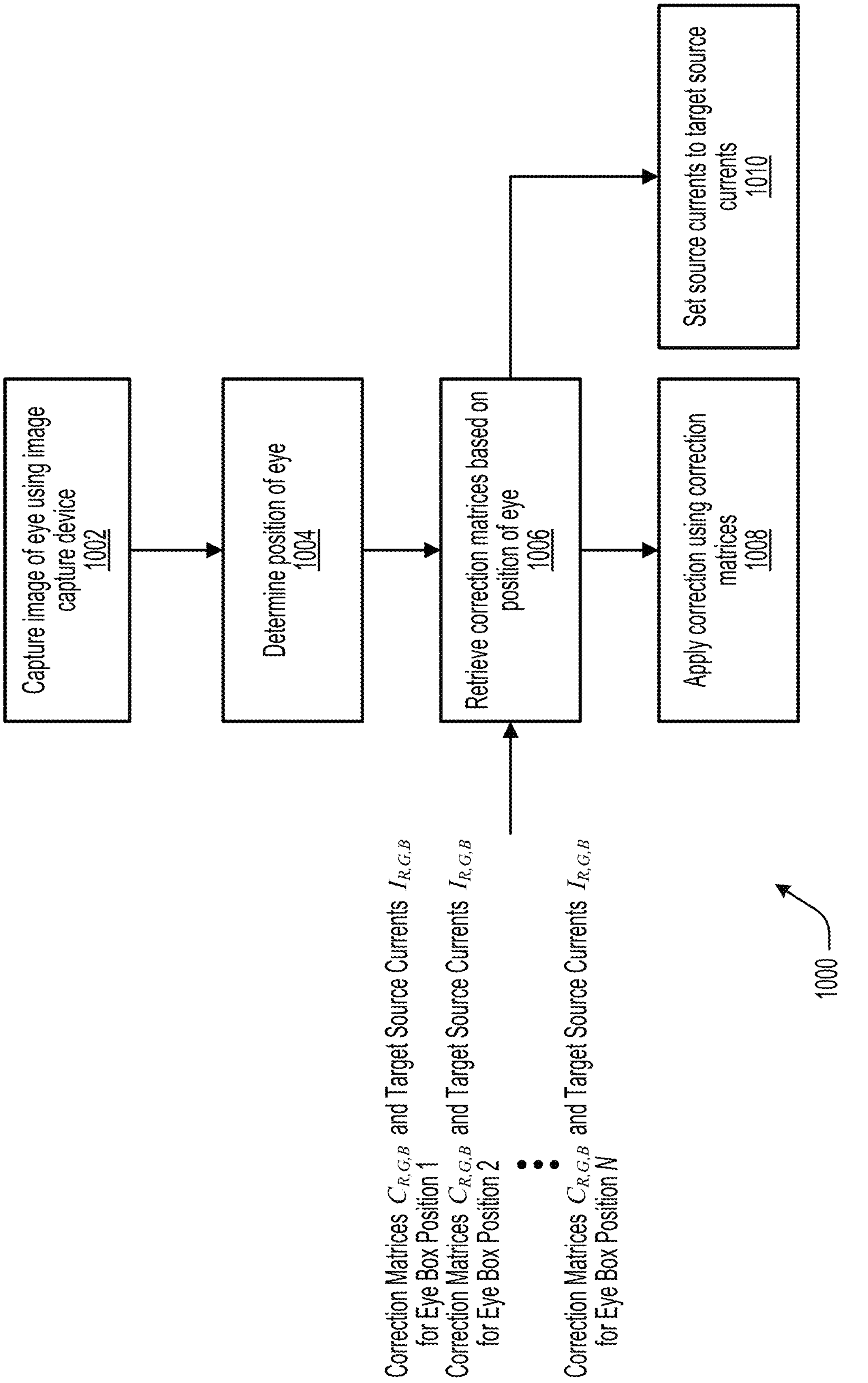
FIG. 10 illustrates a method of improving the color uniformity of a display for multiple eye positions.

FIG. 10 illustrates a method 1000 of improving the color uniformity of a display for multiple eye positions within an eye box (or eye box positions), according to some embodiments of the present disclosure. One or more steps of method 1000 may be omitted during performance of method 1000, and steps of method 1000 need not be performed in the order shown. One or more steps of method 1000 may be performed by one or more processors. Method 1000 may be implemented as a computer-readable medium or computer program product comprising instructions which, when the program is executed by one or more computers, cause the one or more computers to carry out the steps of method 1000. Steps of method 100 may incorporate and/or may be used in conjunction with one or more steps of the various other methods described herein.

At step 1002, an image of an eye of a user is captured using an image capture device. The image capture device may be an eye-facing camera of a wearable device.

At step 1004, a position of the eye within the eye box is determined based on the image of the eye.

At step 1006, a plurality of correction matrices are retrieved based on the position of the eye within the eye box. For example, multiple pluralities of correction matrices corresponding to multiple eye positions may be stored in a memory device, as described in reference to FIG. 9. The plurality of correction matrices corresponding to the eye position that is closest to the determined eye position may be retrieved. Optionally, at step 1006, a plurality of target source currents are also retrieved based on the position of the eye within the eye box. For example, multiple sets of target source currents corresponding to multiple eye positions may be stored in the memory device, as described in reference to FIG. 9. The plurality of target source currents corresponding to the eye position that is closest to the determined eye position may be retrieved.

At step 1008, a correction is applied to a video sequence and/or images to be displayed using the plurality of correction matrices retrieved at step 1006. In some embodiments, the correction may be applied to the video sequence prior to sending the video sequence to the SLM. In some embodiments, the correction may be applied to settings of the SLM. Other possibilities are contemplated.

At step 1010, a plurality of source currents associated with the display are set to the plurality of target source currents retrieved at step 1006.

Figure 11:
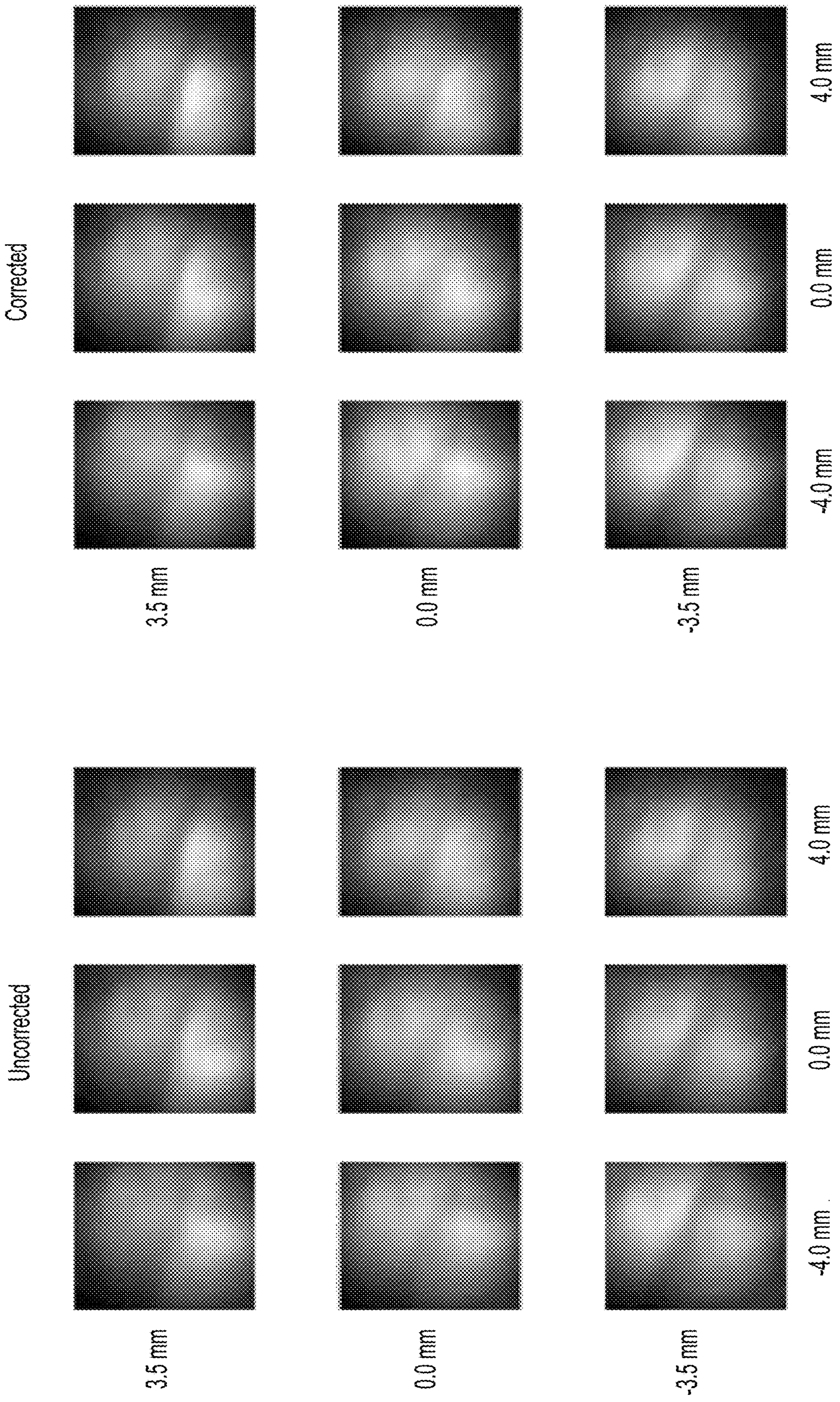
FIG. 11 illustrates an example of improved color uniformity for multiple eye positions.

FIG. 11 illustrates an example of improved color uniformity for multiple eye positions using various methods described herein. In the illustrated example, the color uniformity correction algorithms were applied to an LED illuminated, LCOS SLM, diffractive waveguide display system. Uncorrected and corrected images showing the improvement in color uniformity are shown on the left side and right side of FIG. 11, respectively. FIG. 11 includes colored features that have been converted into grayscale for reproduction purposes.

Figure 12:
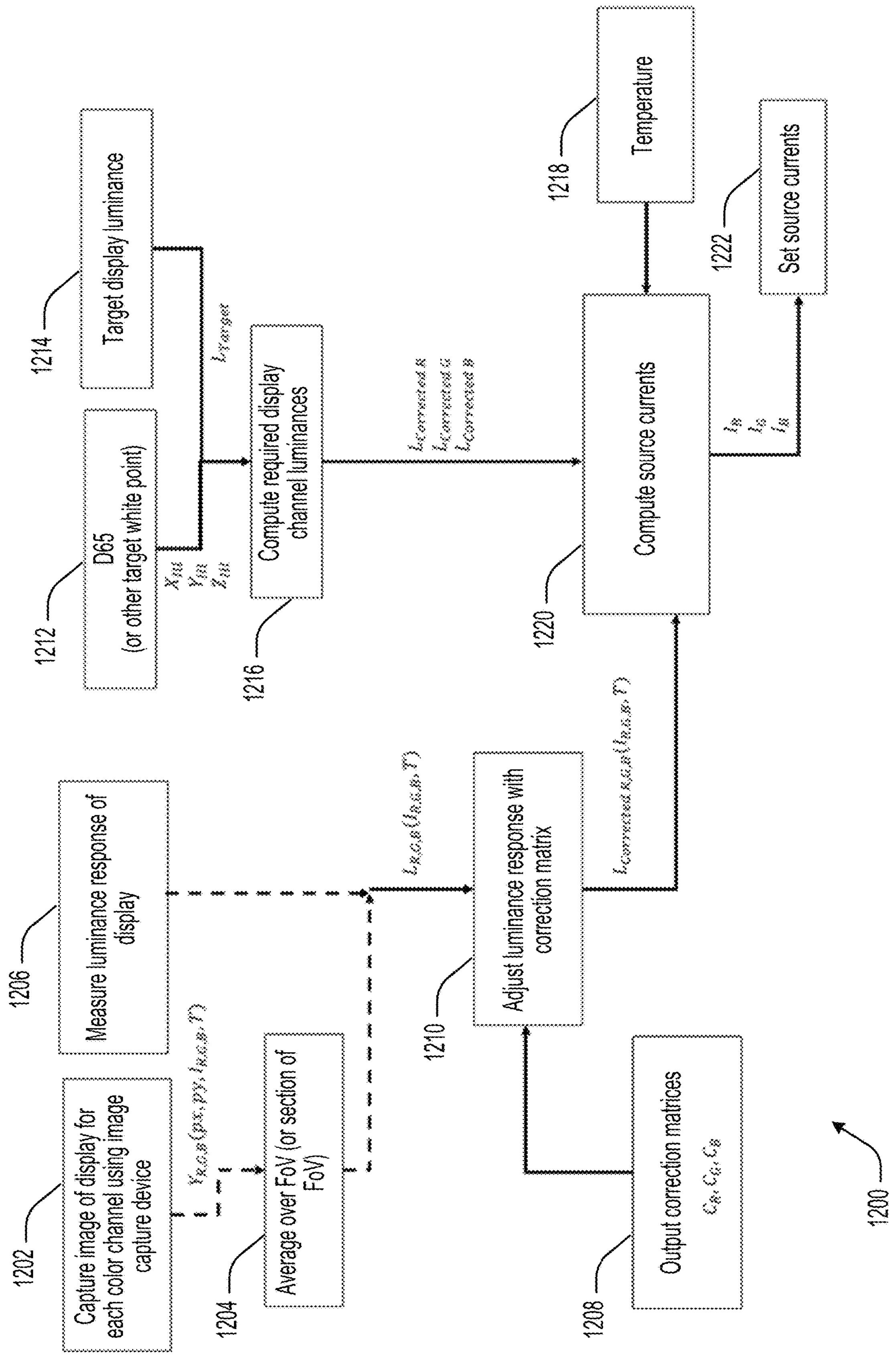
FIG. 12 illustrates a method of determining and setting source currents of a display device.

FIG. 12 illustrates a method 1200 of determining and setting source currents of a display device, according to some embodiments of the present disclosure. One or more steps of method 1200 may be omitted during performance of method 1200, and steps of method 1200 need not be performed in the order shown. One or more steps of method 1200 may be performed by one or more processors. Method 1200 may be implemented as a computer-readable medium or computer program product comprising instructions which, when the program is executed by one or more computers, cause the one or more computers to carry out the steps of method 1200. Steps of method 1200 may incorporate and/or may be used in conjunction with one or more steps of the various other methods described herein.

At step 1202, a plurality of images are captured of a display by an image capture device. Each of the plurality of images may correspond to one of a plurality of color channels.

At step 1204, the plurality of images are averaged over a FoV.

At step 1206, the luminance response of the display is measured.

At step 1208, a plurality of correction matrices are outputted. In some embodiments, the plurality of correction matrices are outputted by a color correction algorithm.

At step 1210, the luminance response is adjusted using the plurality of correction matrices.

At step 1212, a target white point is determined.

At step 1214, a target display luminance is determined.

At step 1216, required display channel luminances are determined based on the target white point and the target display luminance.

At step 1218, a temperature of the display is determined.

At step 1220, a plurality of target source currents are determined based on the luminance response, the required display channel luminances, and/or the temperature.

At step 1222, the plurality of source currents are set to the plurality of target source currents.

Figure 13:
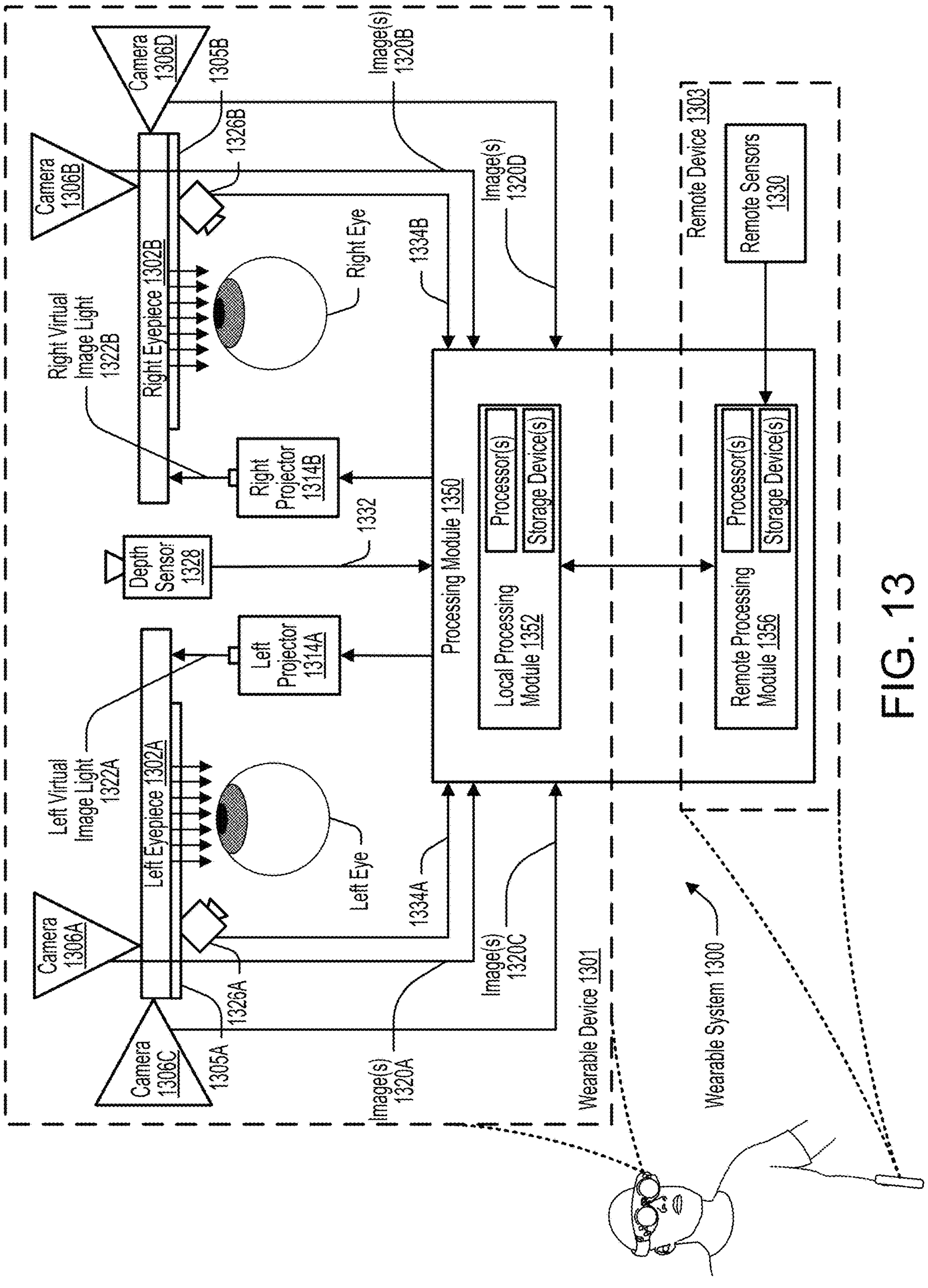
FIG. 13 illustrates a schematic view of an example wearable system.

FIG. 13 illustrates a schematic view of an example wearable system 1300 that may be used in one or more of the above-described embodiments, according to some embodiments of the present disclosure. Wearable system 1300 may include a wearable device 1301 and at least one remote device 1303 that is remote from wearable device 1301 (e.g., separate hardware but communicatively coupled). While wearable device 1301 is worn by a user (generally as a headset), remote device 1303 may be held by the user (e.g., as a handheld controller) or mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Wearable device 1301 may include a left eyepiece 1302A and a left lens assembly 1305A arranged in a side-by-side configuration and constituting a left optical stack. Left lens assembly 1305A may include an accommodating lens on the user side of the left optical stack as well as a compensating lens on the world side of the left optical stack. Similarly, wearable device 1301 may include a right eyepiece 1302B and a right lens assembly 1305B arranged in a side-by-side configuration and constituting a right optical stack. Right lens assembly 1305B may include an accommodating lens on the user side of the right optical stack as well as a compensating lens on the world side of the right optical stack.

In some embodiments, wearable device 1301 includes one or more sensors including, but not limited to: a left front-facing world camera 1306A attached directly to or near left eyepiece 1302A, a right front-facing world camera 1306B attached directly to or near right eyepiece 1302B, a left side-facing world camera 1306C attached directly to or near left eyepiece 1302A, a right side-facing world camera 1306D attached directly to or near right eyepiece 1302B, a left eye tracking camera 1326A directed toward the left eye, a right eye tracking camera 1326B directed toward the right eye, and a depth sensor 1328 attached between eyepieces 1302. Wearable device 1301 may include one or more image projection devices such as a left projector 1314A optically linked to left eyepiece 1302A and a right projector 1314B optically linked to right eyepiece 1302B.

Wearable system 1300 may include a processing module 1350 for collecting, processing, and/or controlling data within the system. Components of processing module 1350 may be distributed between wearable device 1301 and remote device 1303. For example, processing module 1350 may include a local processing module 1352 on the wearable portion of wearable system 1300 and a remote processing module 1356 physically separate from and communicatively linked to local processing module 1352. Each of local processing module 1352 and remote processing module 1356 may include one or more processing units (e.g., central processing units (CPUs), graphics processing units (GPUs), etc.) and one or more storage devices, such as non-volatile memory (e.g., flash memory).

Processing module 1350 may collect the data captured by various sensors of wearable system 1300, such as cameras 1306, eye tracking cameras 1326, depth sensor 1328, remote sensors 1330, ambient light sensors, microphones, inertial measurement units (IMUs), accelerometers, compasses, Global Navigation Satellite System (GNSS) units, radio devices, and/or gyroscopes. For example, processing module 1350 may receive image(s) 1320 from cameras 1306. Specifically, processing module 1350 may receive left front image(s) 1320A from left front-facing world camera 1306A, right front image(s) 1320B from right front-facing world camera 1306B, left side image(s) 1320C from left side-facing world camera 1306C, and right side image(s) 1320D from right side-facing world camera 1306D. In some embodiments, image(s) 1320 may include a single image, a pair of images, a video comprising a stream of images, a video comprising a stream of paired images, and the like. Image(s) 1320 may be periodically generated and sent to processing module 1350 while wearable system 1300 is powered on, or may be generated in response to an instruction sent by processing module 1350 to one or more of the cameras.

Cameras 1306 may be configured in various positions and orientations along the outer surface of wearable device 1301 so as to capture images of the user's surrounding. In some instances, cameras 1306A, 1306B may be positioned to capture images that substantially overlap with the FOVs of a user's left and right eyes, respectively. Accordingly, placement of cameras 1306 may be near a user's eyes but not so near as to obscure the user's FOV. Alternatively or additionally, cameras 1306A, 1306B may be positioned so as to align with the incoupling locations of virtual image light 1322A, 1322B, respectively. Cameras 1306C, 1306D may be positioned to capture images to the side of a user, e.g., in a user's peripheral vision or outside the user's peripheral vision. Image(s) 1320C, 1320D captured using cameras 1306C, 1306D need not necessarily overlap with image(s) 1320A, 1320B captured using cameras 1306A, 1306B.

In some embodiments, processing module 1350 may receive ambient light information from an ambient light sensor. The ambient light information may indicate a brightness value or a range of spatially-resolved brightness values. Depth sensor 1328 may capture a depth image 1332 in a front-facing direction of wearable device 1301. Each value of depth image 1332 may correspond to a distance between depth sensor 1328 and the nearest detected object in a particular direction. As another example, processing module 1350 may receive eye tracking data 1334 from eye tracking cameras 1326, which may include images of the left and right eyes. As another example, processing module 1350 may receive projected image brightness values from one or both of projectors 1314. Remote sensors 1330 located within remote device 1303 may include any of the above-described sensors with similar functionality.

Virtual content is delivered to the user of wearable system 1300 using projectors 1314 and eyepieces 1302, along with other components in the optical stacks. For instance, eyepieces 1302A, 1302B may comprise transparent or semi-transparent waveguides configured to direct and outcouple light generated by projectors 1314A, 1314B, respectively. Specifically, processing module 1350 may cause left projector 1314A to output left virtual image light 1322A onto left eyepiece 1302A, and may cause right projector 1314B to output right virtual image light 1322B onto right eyepiece 1302B. In some embodiments, projectors 1314 may include micro-electromechanical system (MEMS) SLM scanning devices. In some embodiments, each of eyepieces 1302A, 1302B may comprise a plurality of waveguides corresponding to different colors. In some embodiments, lens assemblies 1305A, 1305B may be coupled to and/or integrated with eyepieces 1302A, 1302B. For example, lens assemblies 1305A, 1305B may be incorporated into a multi-layer eyepiece and may form one or more layers that make up one of eyepieces 1302A, 1302B.

Figure 14:
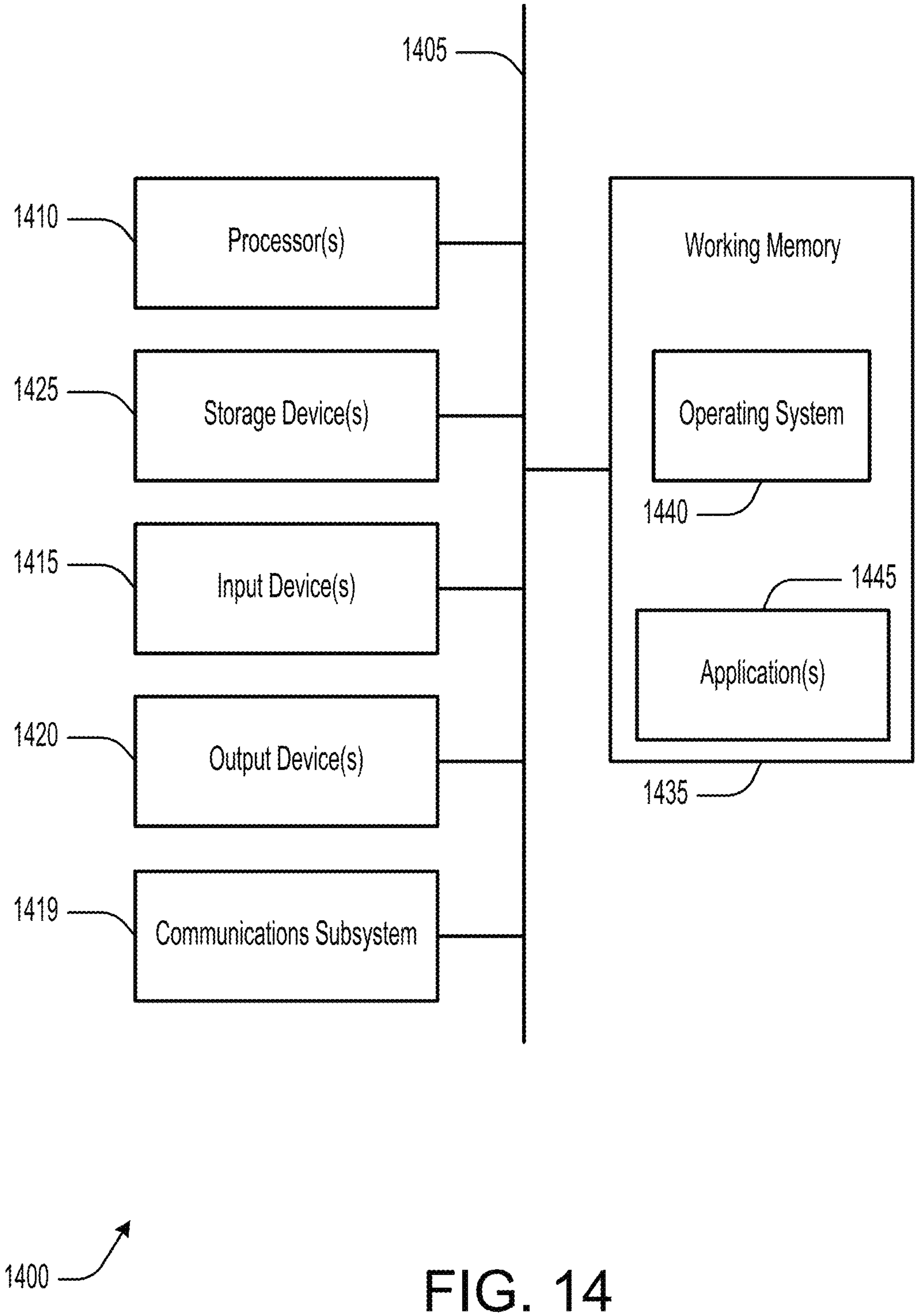
FIG. 14 illustrates a simplified computer system.

FIG. 14 illustrates a simplified computer system, according to some embodiments of the present disclosure. Computer system 1400 as illustrated in FIG. 14 may be incorporated into devices described herein. FIG. 14 provides a schematic illustration of one embodiment of computer system 1400 that can perform some or all of the steps of the methods provided by various embodiments. It should be noted that FIG. 14 is meant only to provide a generalized illustration of various components, any or all of which may be utilized as appropriate. FIG. 14, therefore, broadly illustrates how individual system elements may be implemented in a relatively separated or relatively more integrated manner.

Computer system 1400 is shown comprising hardware elements that can be electrically coupled via a bus 1405, or may otherwise be in communication, as appropriate. The hardware elements may include one or more processors 1410, including without limitation one or more general-purpose processors and/or one or more special-purpose processors such as digital signal processing chips, graphics acceleration processors, and/or the like; one or more input devices 1415, which can include without limitation a mouse, a keyboard, a camera, and/or the like; and one or more output devices 1420, which can include without limitation a display device, a printer, and/or the like.

Computer system 1400 may further include and/or be in communication with one or more non-transitory storage devices 1425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1400 might also include a communications subsystem 1419, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1419 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1419. In other embodiments, a portable electronic device, e.g. the first electronic device, may be incorporated into computer system 1400, e.g., an electronic device as an input device 1415. In some embodiments, computer system 1400 will further comprise a working memory 1435, which can include a RAM or ROM device, as described above.

Computer system 1400 also can include software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1425 described above. In some cases, the storage medium might be incorporated within a computer system, such as computer system 1400. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1400 and/or might take the form of source and/or installable code, which, upon compilation and/or installation on computer system 1400 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1400 to perform methods in accordance with various embodiments of the technology. According to a set of embodiments, some or all of the procedures of such methods are performed by computer system 1400 in response to processor 1410 executing one or more sequences of one or more instructions, which might be incorporated into the operating system 1440 and/or other code, such as an application program 1445, contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processor(s) 1410 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1400, various computer-readable media might be involved in providing instructions/code to processor(s) 1410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1425. Volatile media include, without limitation, dynamic memory, such as the working memory 1435.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1400.

The communications subsystem 1419 and/or components thereof generally will receive signals, and the bus 1405 then might carry the signals and/or the data, instructions, etc. carried by the signals to the working memory 1435, from which the processor(s) 1410 retrieves and executes the instructions. The instructions received by the working memory 1435 may optionally be stored on a non-transitory storage device 1425 either before or after execution by the processor(s) 1410.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of improving a color uniformity of a display of a wearable device, the method comprising:

capturing a plurality of images of the display using an image capture device, wherein the plurality of images are captured in a color space, and wherein each of the plurality of images corresponds to one of a plurality of color channels;

performing a global white balance to the plurality of images to obtain a plurality of normalized images each corresponding to one the plurality of color channels;

performing a local white balance to the plurality of normalized images to obtain a plurality of correction matrices each corresponding to one of the plurality of color channels, wherein performing the local white balance includes, during each of multiple iterations through a loop using the plurality of normalized images:

defining a set of weighting factors based on a figure of merit;

computing a plurality of weighted images based on the plurality of normalized images and the set of weighting factors; and computing the plurality of correction matrices based on the plurality of weighted images; and after computing the plurality of correction matrices and while the wearable device is being worn by a user:

correcting a video sequence to be displayed at the wearable device using the plurality of correction matrices; and displaying the corrected video sequence at the display.

2. The method of claim 1, wherein the figure of merit is at least one of:

an electrical power consumption;

a color error; or a minimum bit-depth.

3. The method of claim 1, wherein defining the set of weighting factors based on the figure of merit includes:

minimizing the figure of merit by varying the set of weighting factors; and determining the set of weighting factors at which the figure of merit is minimized.

4. The method of claim 1, wherein the color space is one of:

a CIELUV color space;

a CIEXYZ color space; or a sRGB color space.

5. The method of claim 1, wherein performing the global white balance to the plurality of images includes:

determining target illuminance values in the color space based on a target white point, wherein the plurality of normalized images are computed based on the target illuminance values.

6. The method of claim 5, wherein the plurality of correction matrices are computed further based on the target illuminance values.

7. The method of claim 1, wherein the display is a diffractive waveguide display.

8. A non-transitory computer-readable medium comprising instructions that, when executed by one or more processors, cause the one or more processors to perform operations comprising:

capturing a plurality of images of a display of a wearable device using an image capture device, wherein the plurality of images are captured in a color space, and wherein each of the plurality of images corresponds to one of a plurality of color channels;

performing a global white balance to the plurality of images to obtain a plurality of normalized images each corresponding to one the plurality of color channels;

performing a local white balance to the plurality of normalized images to obtain a plurality of correction matrices each corresponding to one of the plurality of color channels, wherein performing the local white balance includes, during each of multiple iterations through a loop using the plurality of normalized images:

defining a set of weighting factors based on a figure of merit;

computing a plurality of weighted images based on the plurality of normalized images and the set of weighting factors; and computing the plurality of correction matrices based on the plurality of weighted images; and after computing the plurality of correction matrices and while the wearable device is being worn by a user:

correcting a video sequence to be displayed at the wearable device using the plurality of correction matrices; and displaying the corrected video sequence at the display.

9. The non-transitory computer-readable medium of claim 8, wherein the figure of merit is at least one of:

an electrical power consumption;

a color error; or a minimum bit-depth.

10. The non-transitory computer-readable medium of claim 8, wherein defining the set of weighting factors based on the figure of merit includes:

minimizing the figure of merit by varying the set of weighting factors; and determining the set of weighting factors at which the figure of merit is minimized.

11. The non-transitory computer-readable medium of claim 8, wherein the color space is one of:

a CIELUV color space;

a CIEXYZ color space; or a sRGB color space.

12. The non-transitory computer-readable medium of claim 8, wherein performing the global white balance to the plurality of images includes:

determining target illuminance values in the color space based on a target white point, wherein the plurality of normalized images are computed based on the target illuminance values.

13. The non-transitory computer-readable medium of claim 12, wherein the plurality of correction matrices are computed further based on the target illuminance values.

14. The non-transitory computer-readable medium of claim 8, wherein the display is a diffractive waveguide display.

15. A system comprising:

one or more processors; and a non-transitory computer-readable medium comprising instructions that, when executed by the one or more processors, cause the one or more processors to perform operations comprising:

capturing a plurality of images of a display of a wearable device using an image capture device, wherein the plurality of images are captured in a color space, and wherein each of the plurality of images corresponds to one of a plurality of color channels;

performing a global white balance to the plurality of images to obtain a plurality of normalized images each corresponding to one the plurality of color channels;

performing a local white balance to the plurality of normalized images to obtain a plurality of correction matrices each corresponding to one of the plurality of color channels, wherein performing the local white balance includes, during each of multiple iterations through a loop using the plurality of normalized images:

defining a set of weighting factors based on a figure of merit;

computing a plurality of weighted images based on the plurality of normalized images and the set of weighting factors; and computing the plurality of correction matrices based on the plurality of weighted images;

after computing the plurality of correction matrices and while the wearable device is being worn by a user:

correcting a video sequence to be displayed at the wearable device using the plurality of correction matrices; and displaying the corrected video sequence at the display.

16. The system of claim 15, wherein the figure of merit is at least one of:

an electrical power consumption;

a color error; or a minimum bit-depth.

17. The system of claim 15, wherein defining the set of weighting factors based on the figure of merit includes:

minimizing the figure of merit by varying the set of weighting factors; and determining the set of weighting factors at which the figure of merit is minimized.

* * * * *